Sept. 15, 1925.  1,553,869
J. G. MACLAREN
MARKING DEVICE FOR PNEUMATIC DISPATCH CARRIERS
Filed Oct. 11, 1922   2 Sheets-Sheet 1
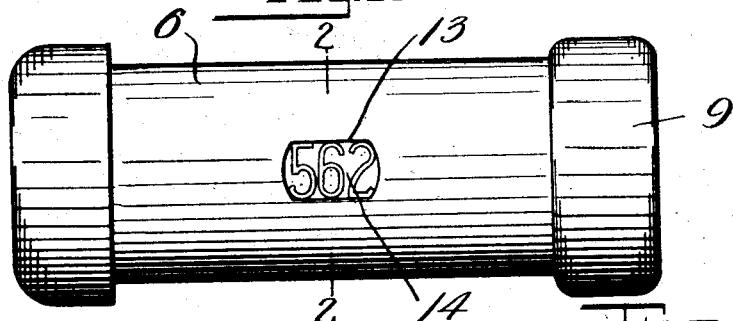
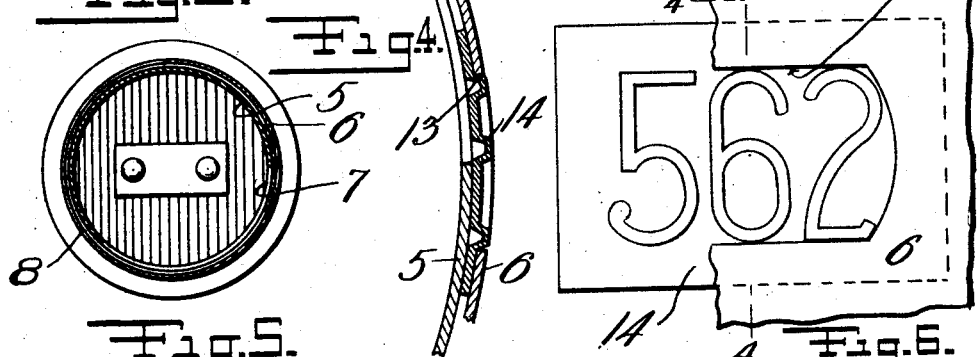
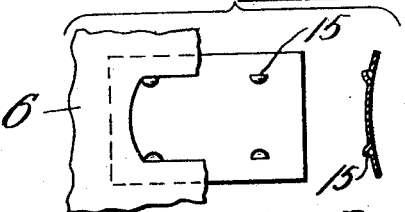
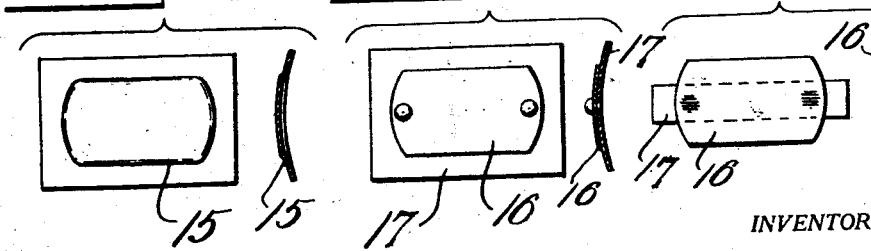
INVENTOR
BY James G. Maclaren
ATTORNEY Sept. 15, 1925.
J. G. MACLAREN
1,553,869
MARKING DEVICE FOR PNEUMATIC DISPATCH CARRIERS
Filed Oct. 11, 1922  2 Sheets-Sheet 2
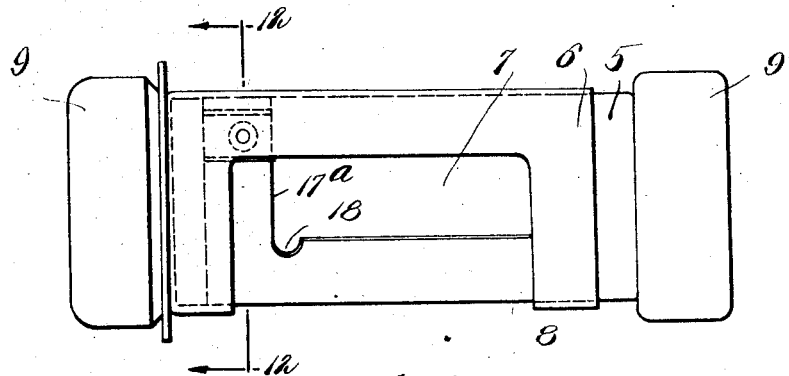
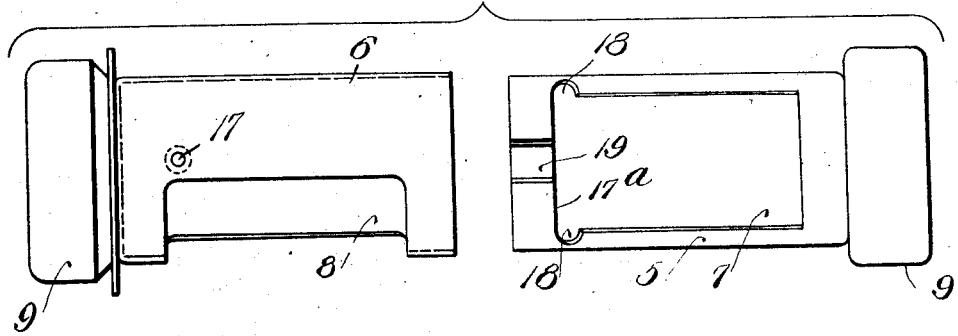
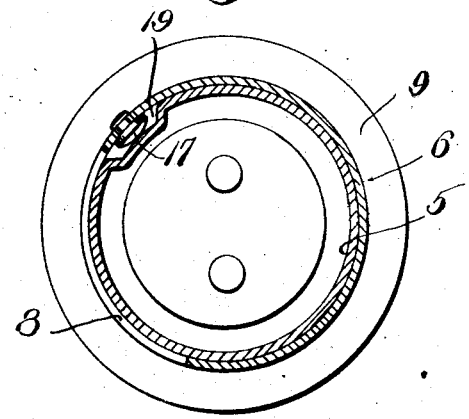
Inventor
James G. Maclaren,
by Roberts Roberts Cushman
Attorneys.

Patented Sept. 15, 1925.

1,553,869

UNITED STATES PATENT OFFICE.

JAMES G. MACLAREN, OF MAMARONECK, NEW YORK, ASSIGNOR, BY MESNE ASSIGNMENTS, TO THE LAMSON COMPANY, A CORPORATION OF MASSACHUSETTS.

MARKING DEVICE FOR PNEUMATIC-DISPATCH CARRIERS.

Application filed October 11, 1922. Serial No. 593,686.

*To all whom it may concern:*

Be it known that I, JAMES G. MACLAREN, a citizen of the United States, residing at Mamaroneck, in the county of Westchester and State of New York, have invented certain new and useful Improvements in Marking Devices for Pneumatic-Dispatch Carriers, of which the following is a specification.

This invention relates to carriers for use in pneumatic dispatch apparatus and more particularly to identification means used in connection with the carriers.

The carriers referred to are of that general class made up of inner and outer shells movable with relation to each other to bring access openings in the shells into or out of alined relation. The principal feature of the invention consists in the use of interchangeable markers fitting into sight openings formed for the purpose in the outer shell and held in position therein by the engagement therewith of the outer surface of the inner shell.

In the drawings in which a preferred form of the invention has been selected for illustration, Figure 1 is a view in side elevation of a dispatch carrier including an embodiment of the invention.

Figure 2 is a view in transverse section taken on the line 2—2 of Figure 1.

Figure 3 is a view on an enlarged scale showing in detail the mounting of a marking device shown in Figure 1.

Figure 4 is a cross-sectional view taken on the line 4—4 of Figure 3.

Figure 5 is a combination view similar to Figures 3 and 4 on a smaller scale showing a modified form of marking device.

Figure 6 is a view similar to Figure 5 showing another modification of the invention.

Figure 7 is a view similar to Figure 6 showing another form of the invention.

Figure 8 is a view similar to Figure 7 showing another form of the invention.

Figure 9 is a view similar to Figure 8 showing still another form of the invention.

Fig. 10 is a view similar to Fig. 1, but from the opposite side, showing the carrier parts assembled;

Fig. 11 is a view of the carrier from the same side as Fig. 10, but showing the inner and outer shells of the carrier separated; and Fig. 12 is a section to larger scale on the line 12—12 of Fig. 10.

Referring to the drawings for a more detailed description of the invention the improved carrier includes an inner cylindrical shell 5, and an outer cylindrical shell 6 which are loosely fitted together so that they can be easily rotated relatively to one another to bring the access openings 7 and 8 therein into or out of alinement. Each one of these shells carries the usual terminal buffer 9 formed of felt or other resilient material. A stop or limiting member 17 may be conveniently carried by one of the shells for engagement with complementary recesses formed in the other shell to limit relative rotation of the shells in either direction.

In order to cause each carrier to display an identifying mark or character individual to the carrier, a sight opening 13 is provided in the outer shell 6 which takes the form of a preforation therethrough and in which is displayed the desired mark or character. The identifying mark is preferably borne by a section 14 of sheet material sufficiently thin to permit it to occupy the restricted space between the two shells without interference with the relative rotation thereof. In order to register the indentifying mark with the sight opening 13 portions of the section 14 are embossed or struck up to enter the perforations or sight opening and engage the circumscribing edge thereof to center the mark in the opening. For this purpose raised areas as at 15 may be formed in the sheet section (Figs. 5, 6 and 7) or the numerals or other characters may be themselves embossed or raised (Figs. 3 and 4) to engage the edge of the sight opening and hold the mark in registered position.

I may also provide a sight opening engaging and centering means in the form of a secondary section 16 (Figs. 8 and 9) of sheet material formed to fit the sight opening and attached to a layer base sheet 17 which extends beyond the edges of the sight opening and is held between the confronting surfaces of the inner and outer shells. In the structural arrangement the smaller section 16 would bear the designating characters as will be clear. A like effect may be obtained by reducing the thickness of a section of sheet material on one surface along the edge leaving a relatively thicker central portion substantially fitting the sight opening and bearing the identifying characters.

I preferably make use of metal as a material from which to construct the markers although other material such as celluloid may be used if desired. It will be seen that the identifying marker of any given carrier receptacle may be removed and another marker substituted therefor by merely separating the two shells for which provision is made as follows: The shells not only are capable of relative rotational or angular movement as has been described but they are also capable of movement longitudinally by a telscoping action. The shells are normally restrained from such movement by the engagement of a suitable stop lug, preferably the aforesaid member 17, with an abutment element of the other shell, for example with the inner edge 17ª of the sight opening 7. In order to bring about the longitudinal or axial separation referred to a recess or indented channel 19 in the inner shell is brought into axial alinement with the stop lug by relative rotation of the shells. Separation of the shells longitudinally can then be effected as will be clear whereby an interchange of markers may be effected.

It will be clear that in the arrangement described a marking device is made use of which is always in sight regardless of the relative position of the shells, which does not require means for holding it in place other than the relation of the shells themselves, and which does not extend outwardly beyond the peripheral surface of the outer shell.

What I claim is:—

1. A pneumatic carrier comprising concentric cylindrical hollow rotatable shells each having a fixed head at one end, said shells having access openings in their side walls adapted to be moved into and out of registry by relative rotation of the shells, the outer shell also having a sight opening in its side wall, and an identifying marker bearing against the outer surface of the inner shell and observable through the sight opening in the outer shell.

2. A pneumatic dispatch carrier comprising a pair of relatively rotatable inner and outer shells, said shells having openings respectively in their side walls adapted to be moved into or out of registry by relative rotation of the shells, the outer shell also having a sight opening in its side wall, and an identifying marker formed of relatively thin material disposed between the opposed surfaces of the shells without interfering with the relative rotation of the shells, said marker being visible through the sight opening in the outer shell.

3. In a pneumatic dispatch carrier comprising, including a pair of relatively rotatable inner and outer shells, an interchangeable identifying marker formed of relatively thin material adapted to occupy a position between the confronting surfaces of the shells without interference with the relative rotation thereof, the outer shell being provided with a sight opening through which the marker is displayed, and means for causing the marker to retain registration with the sight opening.

4. A pneumatic dispatch carrier comprising a pair of relatively rotatable inner and outer shells, an interchangeable identifying marker formed of relatively thin material adapted to occupy a position between the confronting surfaces of the shells without interference with the relative rotation thereof, the outer shell being provided with a sight opening through which the marker is displayed, and means carried by the marker arranged to enter the sight opening and retain the marker in registration therewith.

5. A pneumatic dispatch carrier comprising a pair of relatively rotatable inner and outer shells, an interchangeable identifying marker formed of relatively thin material adapted to occupy a position between the confronting surfaces of the shells, the outer shell being provided with a sight opening through which the marker is displayed, and raised protuberances on the marker arranged to enter the sight opening and retain the marker in registration therewith.

6. A pneumatic dispatch carrier comprising a pair of relatively rotatable inner and outer shells, an interchangeable identifying marker formed of relatively thin material adapted to occupy a position between the confronting surfaces of the shells, the outer shell being provided with a sight opening through which the marker is displayed, and the marker being so formed that a portion thereof enters the sight opening and retains the marker in registration therewith.

7. A pneumatic dispatch carrier comprising concentric relatively rotatable cylindrical shells, said shells having access openings adapted to be moved into and out of registry by relative rotation of the shells; one of said shells also having a sight opening in its side wall, and a label interposed between the shells and visible through the opening, the shells being separable to permit insertion or removal of the label.

8. A pneumatic dispatch carrier comprising concentric relatively rotatable cylindrical shells, said shells having access openings adapted to be moved into and out of registry by relative rotation of the shells; one of said shells also having a sight opening in its side wall, a label interposed between the shells and visible through the sight opening, portions of the label underlying the edges of the opening to prevent its removal therethrough, and means normally operative to prevent relative axial movement of the shells but adapted to allow axial separation of the shells whereby to permit insertion or removal of the label.

9. A pneumatic dispatch carrier comprising relatively rotatable concentric shells, having access openings adapted to be moved into and out of registry by relative rotation of the shells, one of said shells also having a sight opening, a removable label visible through said opening, said label having parts interposed between the opposed faces of the shells to prevent its escape through the opening, said shells being movable axially with respect to each other to permit their separation for the insertion and removal of the label, and disengageable elements carried by the respective shells normally preventing such axial separation.

10. A pneumatic dispatch carrier comprising relatively rotatable telescoping shells, said shells having registrable access openings in their peripheral walls, and means operative in all but one angular position of said shells to prevent axial separation of the shells, said means automatically becoming inoperative when the shells are turned relatively to one another to occupy said one angular position.

11. A pneumatic dispatch carrier comprising relatively rotatable telescoping cylindrical shells of substantially equal length and having access openings in their peripheral walls, and normally engaging parts carried by the respective shells adapted to prevent axial separation of the shells, said parts automatically becoming disengaged when the shells are turned to occupy a predetermined relative position.

12. A pneumatic dispatch carrier comprising relatively rotatable inner and outer shells having access openings in their peripheral walls, a stop lug projecting from one shell and normally engaging a part of the other shell to prevent axial separation of the shells, said stop lug being disengaged from said part when the shells are turned relatively to each other into a predetermined position thereby permitting free axial separation of the shells.

13. A pneumatic dispatch carrier comprising relatively rotatable telescoping shells, each shell having an access opening in its side wall, said openings being adapted to be brought into registry by relative rotation of the shells, and a rigid stop lug projecting from one shell and engaging the other shell normally to prevent axial separation of the shells, the latter shell having an axially extending channel through which the lug may pass when the shells occupy one predetermined angular position.

14. A pneumatic dispatch carrier comprising relatively rotatable telescoping cylindrical shells, the respective shells having access openings in their walls which may be brought into and out of registry by relative rotation of the shells, and a stop member projecting from one shell engaging an abutment element of the other shell normally to prevent axial movement of the shells, said abutment element having a way therethrough adapted to permit the passage of said stop and the axial separation of the shells when the latter occupy a predetermined angular relationship.

JAMES G. MACLAREN.